(12) United States Patent
Kim et al.

(10) Patent No.: US 9,016,674 B2
(45) Date of Patent: Apr. 28, 2015

(54) ACTIVE MOUNT

(71) Applicant: Hyundai Motor Company, Seoul (KR)

(72) Inventors: Seung Won Kim, Seoul (KR); Jang Ho Kim, Gyeonggi-do (KR); Yong Jin Kim, Gyeonggi-do (KR); Dong Wook Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/936,455

(22) Filed: Jul. 8, 2013

(65) Prior Publication Data

US 2014/0159292 A1 Jun. 12, 2014

(30) Foreign Application Priority Data

Dec. 12, 2012 (KR) .................. 10-2012-0144885

(51) Int. Cl.
*F16F 5/00* (2006.01)
*F16F 13/26* (2006.01)
*F16F 6/00* (2006.01)

(52) U.S. Cl.
CPC .. *F16F 13/26* (2013.01); *F16F 6/00* (2013.01)

(58) Field of Classification Search
USPC ......... 267/140.14, 140.15; 188/267; 248/562, 248/636; 335/255, 261, 262, 279
See application file for complete search history.

(56) References Cited

U.S. PATENT DOCUMENTS

| | | | | |
|---|---|---|---|---|
| 4,872,652 A * | 10/1989 | Rohner et al. | ........... | 267/140.14 |
| 6,276,673 B1 * | 8/2001 | Hibi et al. | ................ | 267/140.14 |
| 6,325,364 B1 * | 12/2001 | Muramatsu | ............... | 267/140.14 |
| 7,165,761 B2 * | 1/2007 | Muraoka et al. | ......... | 267/140.14 |
| 7,537,202 B2 * | 5/2009 | Watanabe | ................ | 267/140.14 |
| 7,810,798 B2 * | 10/2010 | Ichikawa et al. | ......... | 267/140.14 |
| 8,100,388 B2 * | 1/2012 | Lee et al. | ................. | 267/140.14 |
| 2006/0097587 A1 * | 5/2006 | Ichikawa et al. | ................ | 310/23 |
| 2008/0174058 A1 | 7/2008 | Saiki et al. | | |
| 2009/0256294 A1 * | 10/2009 | Lee et al. | ................. | 267/140.14 |

FOREIGN PATENT DOCUMENTS

| | | |
|---|---|---|
| JP | 2004-156733 A | 6/2004 |
| KR | 10-1998-032553 | 7/1998 |
| KR | 10-0218749 B1 | 9/1999 |
| KR | 2009-0108956 A | 10/2009 |
| KR | 10-2011-0121906 | 11/2011 |
| KR | 10-2012-0029592 | 3/2012 |

* cited by examiner

*Primary Examiner* — Thomas J Williams
*Assistant Examiner* — Mariano Sy
(74) *Attorney, Agent, or Firm* — Mintz Levin Cohn Ferris Glovsky and Popeo, P.C.; Peter F. Corless

(57) ABSTRACT

Disclosed herein is an active mount including a housing surrounding components within the active mount and providing and outer surface, and a core disposed at an inside upper portion of the housing inside having an upper portion protruding outward from the housing. Additionally, an insulator is connected to a lower portion of the core and extends radially outward. An actuating mechanism is disposed at a predetermined distance from a lower portion of the insulator and includes a vertically movable center. A driving unit is disposed horizontally outside of the actuating mechanism and is configured to apply a force for vertically moving the center of the actuating mechanism.

6 Claims, 4 Drawing Sheets

_US 9,016,674 B2_

ACTIVE MOUNT

CROSS-REFERENCE TO RELATED APPLICATION

This application is based on and claims priority from Korean Patent Application No. 10-2012-0144885, filed on Dec. 12, 2012 in the Korean Intellectual Property Office, the disclosure of which is incorporated herein in its entirety by reference.

BACKGROUND OF THE INVENTION

1. Field of the Invention

The present invention relates to an active mount that actively attenuates vibration transmitted from an engine. More particularly, the present invention relates to an active mount that improves the degree of freedom of a layout during designing by reducing the vertical magnitude.

2. Description of the Prior Art

An active mount may be referred to as a device that is disposed between an engine and a vehicle body, and attenuates vibration transmitted from the engine, thereby supporting the engine FIG. 1 is a diagram showing an active mount of the related art. As shown in FIG. 1, the active mount of the related art includes a cylindrical housing 100 that for the most part forms the external shell or appearance of the device, and a core 110 supporting vibration of an engine at an upper portion of the active mount, an insulator 120 made of typically an elastic material, coupled to the core 110 and extending downward from the core 110, a filter orifice 130 disposed under the insulator 120, an actuating plate 140 disposed under the filter orifice 130 to be movable in an up/down, direction an orifice 150 surrounding the outer surface of the actuating plate 140, a diaphragm 160 connected to the lower portion of the actuating plate 140 to be extendible, and a driving unit 170 implemented by an electromagnet and disposed beneath the diaphragm 160 are arranged sequentially downward from core 110 in the housing 100. Additionally, an armature 190 is also typically disposed inside the driving unit 170 and a fork 180 integrally formed with the actuating plate 140 inside the armature 190 is coupled to the armature 190.

The active mount of the related art with this structure is configured to move the armature 190 up and down by applying/cutting a current to/from the driving unit 170 in accordance with a vibration pattern, when the vibration of an engine is transmitted through the core 110. Accordingly, the actuating plate 140 and the fork 180 connected with the armature 190 increases or decreases the space between the core 110 and the actuating plate 140, moving up/down, thereby attenuating the vibration.

Since the driving unit 170 and the armature 190 are disposed under the actuating plate 140, however, the vertical height of the active mount is quite significant. Thus, it is difficult to reduce the vertical size of the overall mount, resulting in a limited degree of freedom in relation to layout design.

SUMMARY OF THE INVENTION

Accordingly, the present invention has been made to solve the above-mentioned problems occurring in the prior art while advantages achieved by the prior art are maintained intact More specifically, the one exemplary embodiment of the present invention provides an active mount includes a housing providing an outer covering for the active mount and a core disposed at an upper portion of the active mount inside the housing and having an upper portion protruding outward from the housing. Additionally, an insulator is connected to a lower portion of the core and extending radially outward toward a lower portion of the insulator, and an actuating mechanism is disposed at a predetermined distance from the lower portion of the insulator, with a vertically movable center. Also, a driving unit may be disposed horizontally outside of the actuating mechanism and configured to apply a force to vertically vertical move the center of the actuating mechanism.

Advantageously, the present invention provides an active mount that improves the degree of freedom of a design layout by allowing vertical downsizing. Additionally, an active mount is provided that is structurally stable due to a flat structure that can resist load amounts that are generated when vibration of an engine is transmitted.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Embodiments of an active mount according to the present invention will be described hereafter in detail with reference to the accompanying drawings. It is assumed that the upper part and the lower part in FIG. 2 are expressed by the terms 'upper' and 'lower' for the convenience of description.

Figure 1:
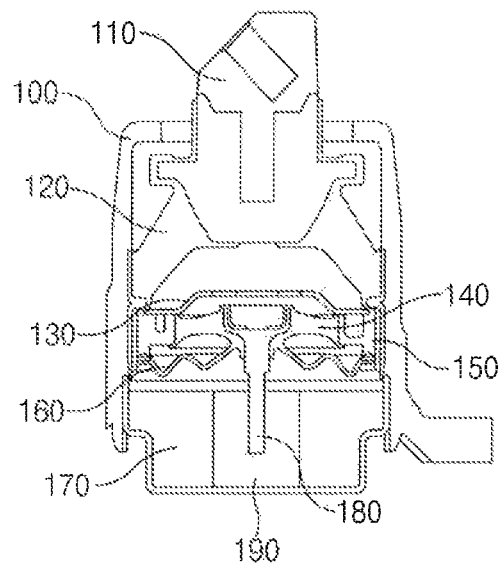
FIG. 1 is a cross-sectional showing an active mount of the related art.
Figure 2:
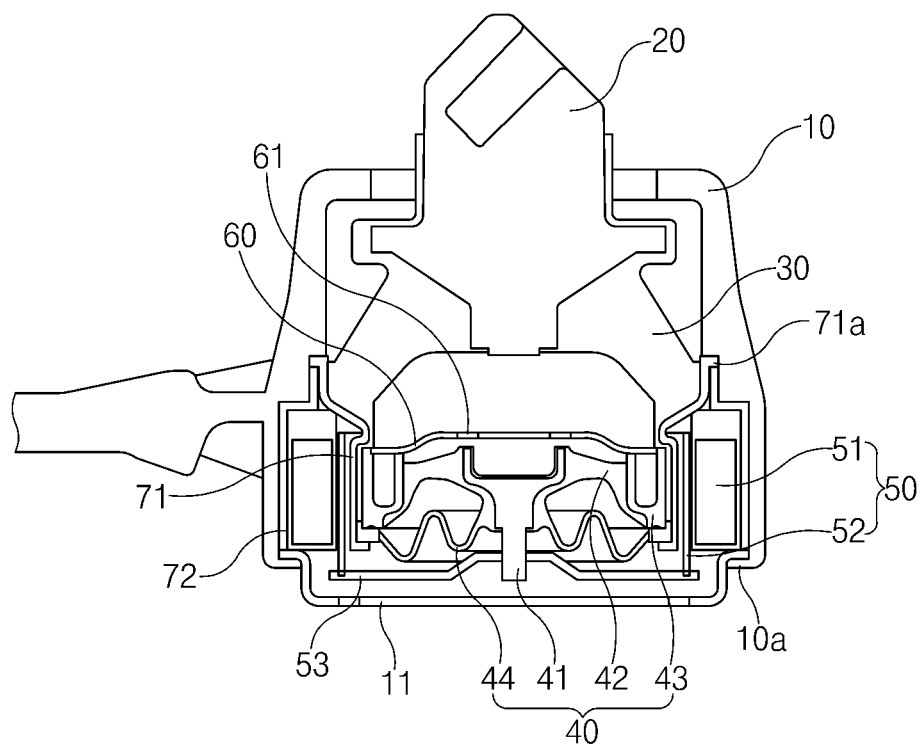
FIG. 2 is a cross-sectional view showing an active mount according to an exemplary embodiment of the present invention.
Figure 3:
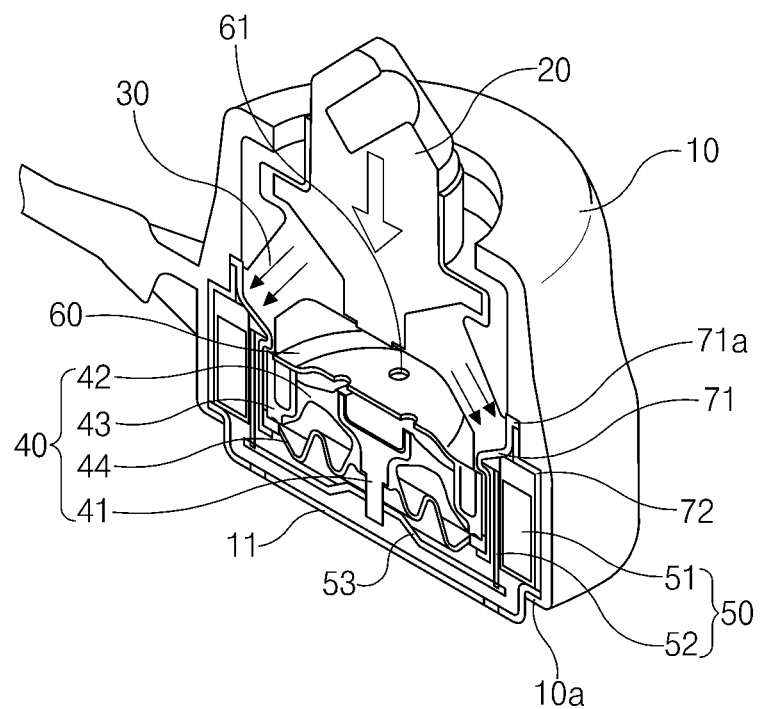
FIG. 3 is a perspective view showing the active mount sectioned, according to an exemplary embodiment of the present invention.

Referring FIGS. 2 and 3 first, an active mount according to the present invention includes a housing 10 that surrounds the components of the active mount thereby providing an outer surface and defines the external appearance. The housing 10 has a substantially cylindrical shape that is slightly narrowed toward one end of the housing, for example the upper side of the housing and thus active mount. Further, the housing 10 is opened at the top and closed at the bottom by a support plate 11.

A core 20, in FIGS. 2 and 3, is disposed at the upper portion inside the housing 10. An upper portion of the core 20 protrudes upward through the opening of the housing 10. The upper portion of the core 20 in most cases is disposed under an engine (not shown), supports the engine, and receives vibration from the engine.

An insulator 30, in FIGS. 2 and 3, is connected to a lower portion of the core 20 within the housing 10. An upper portion of the insulator 30 covers the lower portion of the core 20 and a lower portion of the insulator 30 extends radially outward downward from the upper portion of the insulator and is supported by the inner surface of the housing 10 (preferably, a first support member 71). Further, the insulator 30 may be made of an elastic material such as rubber.

Further, an actuating mechanism 40 is disposed at a predetermined distance under the insulator 30. The actuating mechanism 40 may include an edge fixed within the housing 10 and a vertically movable center. As vibration is transmitted through the core 20 and the insulator 30 from the engine, the actuating mechanism 40 attenuates the vibration from the engine by expanding or contracting the space between the actuating mechanism 40 and the insulator 30 while vertically moving in accordance with a perceived vibration pattern.

The actuating mechanism 40 may have a fork 41 at the center thereof and an actuating plate 42 made of an elastic material covering the fork 41 and extending outward from the fork 41, above the fork 41. An orifice plate 43 may be disposed outside the actuating plate 42, as well. The orifice plate 43 is preferably connected to the edge of the actuating plate 42 in a ring-like shape and has a recession at an upper portion thereof, as shown in FIG. 3. Further, the orifice plate 43 vertically communicates via a through-hole (not shown), and is fixed inside the housing 20.

A diaphragm 44 covering a lower portion of the fork 41 and having an outer end fixed to the orifice plate 43 is disposed under the actuating plate 42. The diaphragm 44 may be made of an elastic material, and as shown in FIGS. 2 and 3, has a shape with a plurality of bends, such as wrinkles, or creases.

In the actuating mechanism 40 having the above configuration, as the fork 41 at the center thereof moves vertically, the center portion of the actuating plate 42 vertically extends/retracts. Further, the fork 41 that has vertically moved is returned to its static position by an elastic force of the actuating plate 42.

Also in FIGS. 2-3, a filter member 60 is disposed between the insulator 30 and the actuating mechanism 40. In the filter 60, the outer edge covers the orifice plate 43 and the center is spaced a predetermined distance from the fork 41. Further, the filter 60 has a plurality of through-holes 61 vertically formed through the center thereof. According to this configuration, as the fork 41 moves vertically, fluid in the space between the actuating mechanism 40 and the insulator 30 flows to the actuating mechanism 40 or the insulator 30 through the through-holes 61.

Further, as shown in FIGS. 2 and 3, a driving unit 50 is disposed horizontally outside of the actuating unit 40. The driving unit 50 serves to generate a force that vertically moves the fork 41 of the actuating mechanism 40. In the exemplary embodiment, since the driving unit 50 is disposed horizontally outside the actuating mechanism 40, the vertical size of the overall mounting structure can be decreased. Therefore, since the vertical size can be decreased, it is possible to improve the degree of freedom of a design layout of a vehicle.

In detail, the driving unit 50 includes a ring-shaped coil electromagnet 51 disposed outside the orifice plate 43 and fixed at a lower portion inside the housing 10 and an armature 52 disposed between the orifice plate 43 and the electromagnet 51. The electromagnet 51 generates a magnetic force, using a current that is supplied by turning on/off an external switch (not shown) that is preferably controlled by a controller (not shown) installed within the vehicle. The armature 52 may be made of metal to be moved vertically by the magnetic force generated by the electromagnet 51 and has a cylindrical shape with a space receiving the actuating mechanism 40. Further, the lower portion of the armature 52 and the lower portion of the fork 41 of the actuating mechanism 40 are connected by a connecting member 53. With this configuration, as the armature 52 is moved vertically by the magnetic force generated by the electromagnet 51, the fork 41 connected to the armature 52 by the connecting member 53 correspondingly moves vertically.

Further, in the housing 10 of the active mount according to the exemplary embodiment of the present invention, a first support member 71 may be disposed between the actuating mechanism 40 and the driving unit 50 and a second support member 72 may be disposed between the driving unit 50 and the housing 10. In detail, the first support member 71 covers the outer surface of the orifice plate 43 of the actuating mechanism 40 and fixes the orifice plate 43 thereto. Further, an upper portion of the first support member 71 supports a lower end of the insulator 30.

The second support member 72 maybe be fixed in close contact between the inner side of the housing 10 and the outer surface of the electromagnet 51 of the driving unit 50. Further, the lower end 10a of the housing 10 may be curled inward and support a lower end of the second support member 72, together with the support plate 81. Therefore, the second support member 72 may be stably fixed in close contact with the housing 10.

Further, an upper portion of the second support member 72 is in close surface contact with the upper portion of the first support member 71, and the upper end 71a of the first support member 71 may be bent outward and secured to the upper end of the second support member 72.

According to this configuration, as a force is applied outward through the core 20 and the insulator 30 by vibration of the engine, the force is transmitted to the second support member 72 through the second support member 72. As this is occurring, however, the second member 72 can resist the force because it is stably fixed to the housing 10. Therefore, it is possible to prevent the core 20 and the insulator 30 from moving down and separating from the housing, which would fail to sufficiently support the core 20 and the insulator 30 when force is applied through the core 20 and the insulator 30, in the exemplary embodiment of the present invention.

The operation of the active mount according to the present invention is described hereafter with reference to FIG. 4.

Figure 4A:
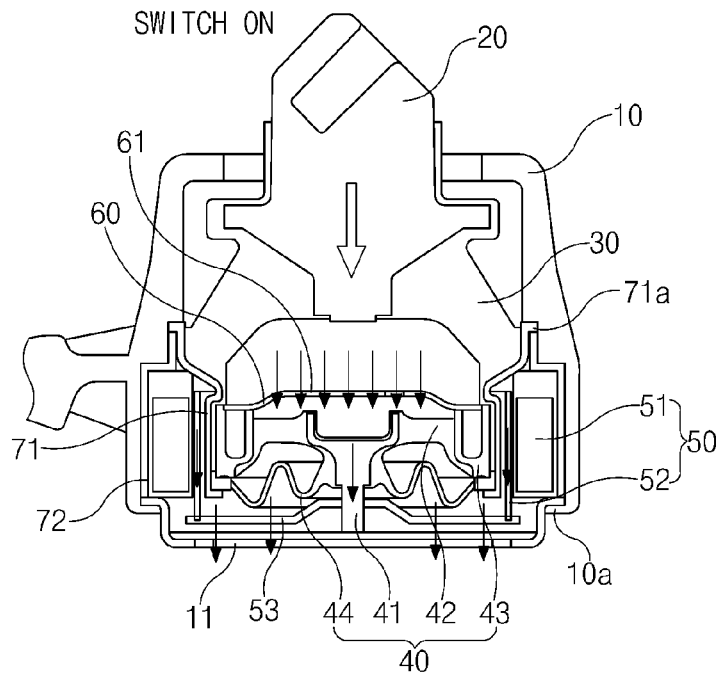
FIGS. 4A-B is a view showing the operation of the active mount according to and exemplary embodiment of the present invention.

First, as shown in FIG. 4A, when vibration is transmitted downward from the engine to the core 20, a vibration pattern of the engine is sensed by a controller (not shown) and a current is supplied to the electromagnet 51 of the driving unit 50 by turning on the external switch (not shown). Accordingly, the electromagnet 51 generates magnetic force and the armature 52 is moved in a downward direction by the magnetic force. As a result, the fork 41 connected to the armature 52 by the connecting member 53 and the center portion of the actuating plate 42 moves downward. Therefore, the force applied downward is removed by expansion of the space between the insulator 30 and the actuating plate 42.

Figure 4B:
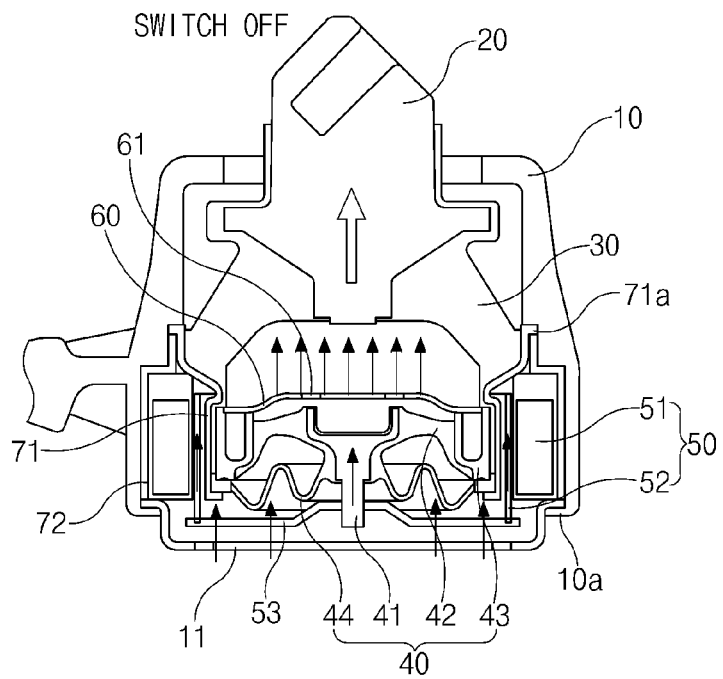

In contrast, as shown in FIG. 4B, when vibration is transmitted upward from the engine to the core 20, the controller stops the current supplied to the electromagnet 51 of the driving unit 50 by turning off the switch. In this case, the electromagnet 51 does not generate a magnetic force and the center portion of the actuating plate 42 that has moved down is returned to the original position by elastic force. Therefore, the force applied upward is removed by contraction of the space between the insulator 30 and the actuating plate 42.

As described above, since the active mount according to the present invention includes a driving unit horizontally outside of an actuating mechanism, it is possible to reduce the vertical size of the overall mount in comparison to active mounts with a driving unit under an actuating unit of the related art, such that it is possible to reduce the entire size. Therefore, the degree of freedom of a design layout is improved.

Further, in the active mount according to the present invention, since the first support member supporting the lower end of the insulator and the second support member being in close contact between the driving unit and the housing are in close surface contact with each other within the upper portion, it is enough to resist a force transmitted from the insulator. Thus, it is possible to stably resist the force transmitted from the outside by using the first and second support member.

Although embodiments of the present invention were described in detail above, the present invention is not limited thereto and may be modified in various ways without departing from the scope defined in the claims.

For example, although the lower portions of the armature 52 and the fork 41 are connected by the connecting member 53, the connecting member 53 may be coupled to portions other than the lower portions of the armature 52 and the fork 41, if it is desired to vertically move the fork 41 by vertically moving the armature 52.

According to the present invention, the active mount has the configuration with a driving unit horizontally outside an actuating mechanism to reduce the vertical size in comparison to active mounts with a driving unit under an actuating unit of the related art, thereby reducing the entire size and improving the freedom of design layout of the vehicle.

The present invention is described with reference to the embodiments illustrated in the drawings, which are only example and can be implemented by various embodiments. Therefore, the true scope of the present invention will be defined only by claims.

What is claimed is:

1. An active mount comprising:
    a housing surrounding components of the active mount to provide an outer surface of the active mount;
    a core disposed at an inside upper portion of the housing and having an upper portion protruding outward from the housing;
    an insulator connected to a lower portion of the core and extending radially outward;
    an actuating mechanism disposed a predetermined distance from a lower portion of the insulator, with a vertically movable center;
    a driving unit disposed horizontally outside the actuating mechanism and configured to apply a force that vertically moves the center of the actuating mechanism;
    a first support member disposed between the actuating mechanism and the driving unit and supporting the lower end of the insulator at the upper portion thereof; and
    a second support member disposed outside of the driving unit between the outer surface of the driving unit and the inner side of the housing,
    wherein an upper portion of the first support member and an upper portion of the second support member are in surface contact with each other.

2. The active mount according to claim 1, wherein the actuating mechanism includes:
    a fork disposed at the center of the actuating mechanism, having a lower end connected to the driving unit, and configured to be moved vertically by the driving unit;
    an actuating plate made of an elastic material, covering the fork, and extending outward;
    an orifice plate disposed outside the actuating plate and fixed inside the housing; and
    a diaphragm covering the fork and disposed under the actuating plate.

3. The active mount according to claim 2, further comprising:
    an electromagnet disposed outside the orifice plate and generating a magnetic force from a current applied thereto; and
    an armature disposed between the orifice plate and the electromagnet, connected with the fork, and configured to be vertically moved by the magnetic force generated from the magnetic force.

4. The active mount according to claim 1, further comprising:
    a filter disposed between the insulator and the actuating mechanism and having through holes vertically formed through the filter.

5. The active mount according to claim 1, wherein the upper end of the first support member is bent outward and secured to the upper portion of the second support member.

6. The active mount according to claim 1, wherein a lower end of the housing is curled inward and supports the lower end of the second support member.

* * * * *